(12) United States Patent
Klein et al.

(10) Patent No.: US 7,631,390 B1
(45) Date of Patent: Dec. 15, 2009

(54) STIFFENED CLEANING CARDS

(75) Inventors: Peter Klein, North Yarmouth, ME (US); John Edward Condon, Sumner, ME (US); Stephen Anthony Bouchard, Auburn, ME (US)

(73) Assignee: Enefco International, Inc., Auburn, ME (US)

( * ) Notice: Subject to any disclaimer, the term of this patent is extended or adjusted under 35 U.S.C. 154(b) by 775 days.

(21) Appl. No.: 11/156,514

(22) Filed: Jun. 20, 2005

(51) Int. Cl.
*B32B 3/02* (2006.01)

(52) U.S. Cl. ................ 15/210.1; 15/256.51; 15/229.12; 15/104.001

(58) Field of Classification Search .......... 151/104.001, 151/210.1, 229.12, 256.51; 428/174, 179, 428/182
See application file for complete search history.

(56) References Cited

U.S. PATENT DOCUMENTS

| | | | |
|---|---|---|---|
| 4,357,615 A * | 11/1982 | Yoshiharu et al. | 346/134 |
| 5,153,964 A * | 10/1992 | Gelardi et al. | 15/229.12 |
| 5,366,785 A * | 11/1994 | Sawdai | 428/156 |
| 5,525,417 A | 6/1996 | Eyler | |
| 5,824,611 A | 10/1998 | Eyler | |
| 5,832,556 A | 11/1998 | Eyler | |
| 5,878,458 A | 3/1999 | Higginbotham | |
| D420,658 S | 2/2000 | Eyler | |
| 6,107,221 A * | 8/2000 | Nakajima et al. | 442/401 |
| 6,156,407 A | 12/2000 | Neubauer et al. | |
| 6,210,490 B1 | 4/2001 | Michael et al. | |
| 6,243,908 B1 * | 6/2001 | Battle et al. | 15/210.1 |
| 6,353,233 B1 | 3/2002 | Kikuchi et al. | |
| 6,611,985 B1 * | 9/2003 | Neubauer et al. | 15/210.1 |
| 2005/0266211 A1 * | 12/2005 | Klein et al. | 428/174 |
| 2006/0019072 A1 * | 1/2006 | Bailey et al. | 428/174 |

\* cited by examiner

*Primary Examiner*—Joseph J Hail, III
*Assistant Examiner*—Robert Scruggs
(74) *Attorney, Agent, or Firm*—Caesar, Rivise, Bernstein, Cohen & Pokotilow, Ltd.

(57) ABSTRACT

A cleaning card for use in cleaning internal surfaces of machine components includes a substrate having a central plane between opposed outer surfaces, a machine direction dimension defined between opposed end edges and a transverse direction dimension defined between opposed side edges. The opposed surfaces have a plurality of discrete raised working areas for engaging and cleaning internal surfaces of the machine components. The working areas each include a peak and a peripheral wall having an edge remote from the peak and the peak of each raised working area is further from the central plane than the edge of the peripheral wall remote from the peak. The cleaning card substrate has an effective working thickness that is greater than the nominal thickness between the opposed surfaces. The substrate also has a plurality of raised, rigidifying areas that extend continuously over a majority of the machine direction dimension of the cleaning card and at least one of the rigidifying areas extends outwardly on each side of the central plane of the substrate.

13 Claims, 1 Drawing Sheet

STIFFENED CLEANING CARDS

FIELD OF THE INVENTION

This invention relates generally to cleaning cards and more specifically to rigidified cleaning cards having the capability of cleaning internal surfaces of machine components. In the most preferred applications the machine components are components of an actuating mechanism of the type intended to be actuated by a substantially rigid operating card or other substantially rigid substrate that is read and/or scanned by the actuating mechanism. Representative actuating mechanisms in which the cleaning cards of this invention are most desirably utilized are ATM machines (actuated by substantially rigid ATM cards), hotel door locks (actuated by substantially rigid key cards) actuating mechanisms of gasoline pumps (operated with conventional credit cards), etc.

BACKGROUND ART

Many machines and devices employ actuating mechanisms that are actuated by a substantially rigid operating card or other substantially rigid substrate that is read and/or scanned by the actuating mechanism to thereby operate the machine or other device. Typical actuating mechanisms employing substantially rigid operating cards are used in conjunction with hotel doors, ATM machines, gasoline pumps and a variety of different vending machines.

In many machines and devices, internal surfaces of the actuating mechanism are spaced apart a distance greater than the permissible thickness of the operating card, to thereby keep the operating card out of contact with those internal surfaces, particularly internal surfaces of sensing mechanisms, e.g., surfaces of magnetic sensors, optical lenses and other surfaces defining the internal cavity of the actuating mechanism. In many of these actuating mechanisms internal rails are often provided to actually support the operating card in a position out of contact with the sensing mechanisms.

U.S. patent application Ser. No. 10/857,382, titled Patterned Cleaning Card and Method of Employing Same, discloses and claims a cleaning card that is capable of cleaning internal surfaces in actuating-mechanisms of the type described in the proceeding paragraph. However, in a number of these latter applications, it is highly desirable to provide a cleaning card that is relatively rigid to provide the desired cleaning function. In fact, in most of the applications wherein the operating card is substantially rigid, and generally of the size and shape of a credit card, or even smaller, it has been desirable to provide a relatively rigid cleaning card to clean internal surfaces of the actuating mechanisms.

The prior art has dealt with the rigidity problem in these latter types of cleaning cards by increasing the thickness of the cleaning cards, relative, for example, to more flexible cleaning cards employed to clean internal mechanisms that are operated by more flexible substrates, such as by paper currency. By increasing the thickness of the cleaning card additional material is required, thereby increasing the overall cost of the product. It should be understood that cleaning cards are relatively inexpensive devices, and any action that can be taken to reduce the manufacturing/material costs of such cleaning cards is highly desirable.

Cleaning cards having raised surfaces for cleaning or removing foreign objects from internal machine surfaces are known in the prior art, as exemplified by the disclosures in U.S. Pat. Nos. 6,243,908 (Battle et al.), 6,107,221 (Nakajima et al.) and 5,153,964 (Gelardi et al.). However, none of these latter patents have dealt with or solved the problem of enhancing rigidity of the cards without excessively increasing material costs.

The disclosures of the Battle '908 patent, the Nakajima et al. '221 patent and the Gelardi et al. '964 patent are hereby fully incorporated herein by reference.

Essentially cleaning cards for cleaning internal surfaces of actuating mechanisms either have been of a size corresponding to a dollar-bill or of a size corresponding to a credit-card. The dollar-bill size cleaning cards generally are employed to clean internal slots intended to receive currency, and are generally provided in a thin, somewhat flexible structure so that the cleaning card can follow a desired curved path in the cleaning mechanism. Credit-card size (or similar sized) cleaning cards generally have been made thicker to establish or provide greater rigidity, since they are used to clean actuating mechanisms that normally receive substantially rigid operating cards, such as credit-cards, electronic keys for hotel door and similar devices. Unfortunately, in order to form the credit-card size cleaning cards with the desired rigidity they generally have been made of a thickness more than twice that of the dollar-bill size cleaning cards, requiring additional material and thereby increasing the manufacturing costs.

The present invention provides a unique and very versatile solution to the problem of cleaning internal surfaces of machine components, and more particularly to cleaning internal surfaces of actuating mechanisms, such as internal surfaces of sensing mechanisms that are spaced apart from each other more than the maximum thickness of a substrate that can be received within the mechanism. In particular, the rigid cleaning cards of this invention have a nominal thickness substantially thinner than prior art cleaning cards having the desired, or required rigidity to provide a desired cleaning operation.

SUMMARY OF THE INVENTION

The above and other objects of this invention are achieved in a cleaning card structure for use in cleaning internal surfaces of machine components; most preferably internal surfaces of an actuating mechanism of the type intended to be actuated by a substantially rigid operating card or other substantially rigid substrate that is read and/or scanned by the actuating mechanism. The cleaning card includes a substrate having a central plane between opposed surfaces thereof, a machine-direction dimension defined between opposed end edges and a transverse-direction dimension defined between opposed side edges. The opposed surfaces each have a plurality of discrete raised working areas for engaging and cleaning internal surfaces of machine components to be cleaned, at least some discrete raised working areas extending outwardly on each side of the central plane of the substrate. The discrete raised working areas each include a peak and a peripheral wall having an edge remote from the peak, with the peak of each raised working area being further from the central plane of the substrate then the edge of the peripheral wall remote from the peak. The cleaning card substrate has an effective working thickness that is greater than the nominal thickness between the opposed surfaces of the substrate. The cleaning card is rigidified by a plurality of raised, rigidifying areas, at least one of the rigidifying areas extending outwardly on each side of the central plane. The raised rigidifying areas extend continuously over a majority of the machine-direction dimension of the cleaning card. In the most preferred embodiments the raised rigidifying areas have an effective rigidifying thickness less than the effective working thickness and greater than the nominal thickness between the opposed surfaces. However, in accordance with the broadest aspects of this invention the effective rigidifying thickness can be greater than the effective working thickness, although there is no perceived benefit in forming the cleaning card in such a manner.

In accordance with a preferred aspect of the invention the discrete raised working areas are sufficiently resilient to engage opposed internal surfaces of machine components, e.g., internal surfaces of an actuating mechanism that are spaced-apart at varying distances from each other, and in particular, are capable of engaging opposed internal surfaces that are spaced apart a distance greater than the nominal thickness of the cleaning card.

In a preferred embodiment of this invention, the raised, rigidifying areas are less resilient than the raised working areas, and are not generally intended or required to provide an internal cleaning function.

In the preferred embodiments of this invention the cleaning card has an effective rigidifying thickness that is substantially the same as the thickness of the operating card for an actuating mechanism to be cleaned.

In the most preferred embodiments of this invention at least three (3), raised rigidifying areas are provided, and most preferably these raised rigidifying areas are contiguous to each other.

Most preferably, when three raised rigidifying areas are provided, two of the raised rigidifying areas extend in one direction from the central plane of the substrate and a third raised rigidifying area extends in an opposite direction from the central plane of the substrate.

In accordance with one preferred embodiment of this invention the raised rigidifying areas are located substantially in the medial region of the substrate substantially mid-way between the opposed side edges of the substrate.

In a preferred embodiment of this invention the plurality of discrete, raised working areas include a first set of raised working areas substantially linearly spaced apart in the machine direction adjacent one side edge of the substrate and a second set of raised working areas substantially linearly spaced apart in the machine direction adjacent the opposed side edge of the substrate. Most preferably each set of raised working areas includes peaks extending outwardly on each side of the central plane and these raised working areas are capable of being compressed (deformed toward the central plane of the substrate 12) by engagement with internal surfaces to be cleaned.

In a preferred embodiment of this invention the raised working areas in each set are included in a plurality of contiguous pairs, each pair including one working area extending outwardly on one side of the central plane and the other working area extending outwardly on the opposite side of the central plane, the contiguous pairs in each set being spaced apart in the machine direction of the substrate.

Reference throughout this application to "nominal thickness" means the actual thickness of the substrate 12 normal to, and between the opposed surfaces 14, 16 of said substrate.

Reference throughout this application to "effective working thickness" means the thickness dimension between planes that are parallel to each other and are tangent to the highest points (e.g., peaks) of the discrete raised working areas on opposite sides of the central plane. In a flat cleaning card, the "effective thickness" and the "nominal thickness" are the same.

Reference throughout this application to "effective rigidifying thickness" means the thickness dimension between planes that are parallel to each other and are tangent to the highest points (e.g., peaks) of the linearly extending, raised, rigidifying areas on opposite sides of the central plane.

Reference throughout this application to "apex," "peak," "apices" or "peaks" refers to the highest location of the discrete raised areas being described, which, unless specifically limited, can be a flat surface, the upper region of a curved surface, a linear edge, or a point.

Reference throughout this application to "peripheral wall" in referring to a portion of a discrete raised area means both a continuous wall extending about the peak, or apex, of a discrete raised area, as well as an interrupted peripheral wall having two or more spaced-apart segments about the apex of a discrete raised area. In particular, reference to "peripheral wall" in this application is a generic term encompassing, inter alia, the peripheral wall structure of the discrete raised working areas and linear, raised, rigidifying areas disclosed in the present application, as well as the peripheral wall structure in all embodiments specifically described and shown in FIGS. 1-9 of co-pending application Ser. No. 10/857,382 titled Patterned Cleaning Card and Method of Manufacturing Same, the subject matter of which already has been incorporated herein by reference.

Reference in this application to discrete raised working areas being "disposed" in any specified direction does not require that the discrete raised working areas be actually spaced apart from each other by substantially flat, non-raised surfaces. In other words, the reference to "disposed" in describing the positional relationship between, or among discrete raised working areas describes an arrangement wherein adjacent discrete raised working areas include peripheral wall edges remote from the apices of said adjacent discrete raised areas, which edges either are in contact with each other or are spaced apart from each other by undeformed regions of the cleaning card substrate.

Reference to "upward" and "downward" or words of similar meaning in referring to the position or location of elements/surfaces of the cleaning cards of this invention is intended to refer to the relative position of the elements/surfaces, rather than the absolute position of such surfaces. For example, raised areas of the cleaning card that are upward in one orientation of the cleaning card become downwardly facing when the card is rotated 180 degrees about a central longitudinal axis. Likewise, upon such rotation raised areas that previously were facing downward become upwardly facing. Reference to such areas being "upward" and "downward" is intended to refer to the relative position of those areas on opposite sides of a central plane of the substrate of the cleaning card.

BRIEF DESCRIPTION OF THE DRAWINGS

The invention will now be described in conjunction with the following drawings in which like reference numerals designate like elements and wherein.

DESCRIPTION OF THE PREFERRED
EMBODIMENTS OF THIS INVENTION

Figure 1:
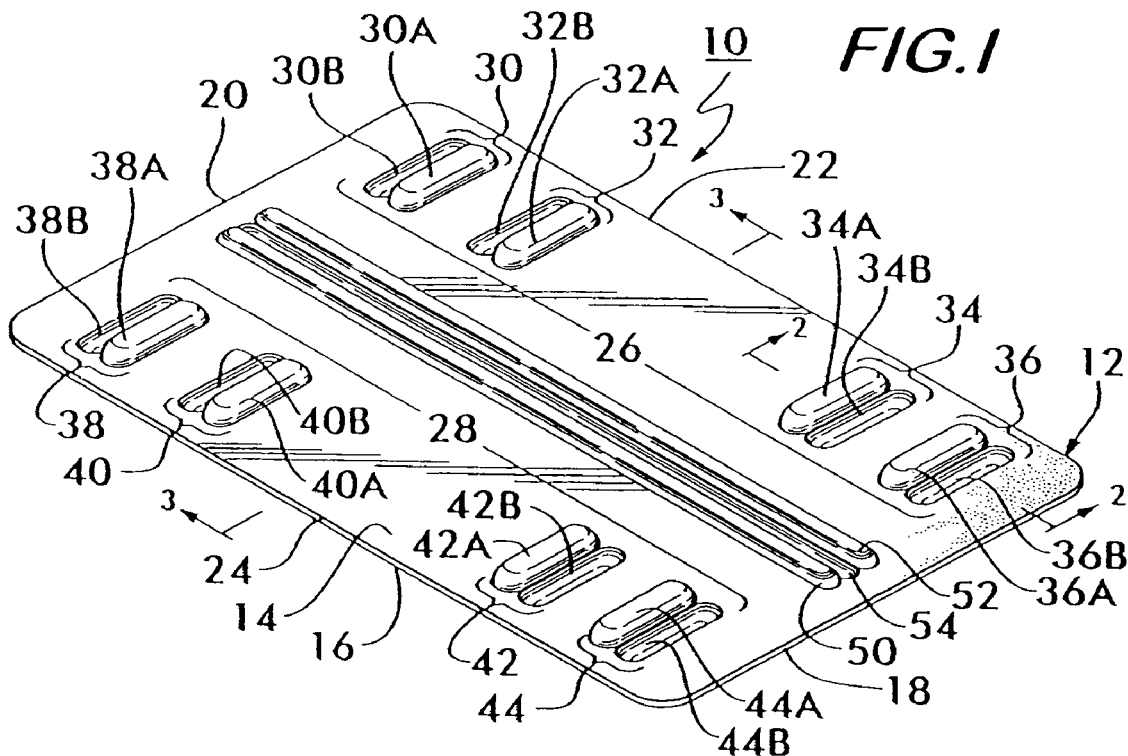
FIG. 1 is a plan view of a cleaning card in accordance with a preferred embodiment of this invention.
Figure 2:
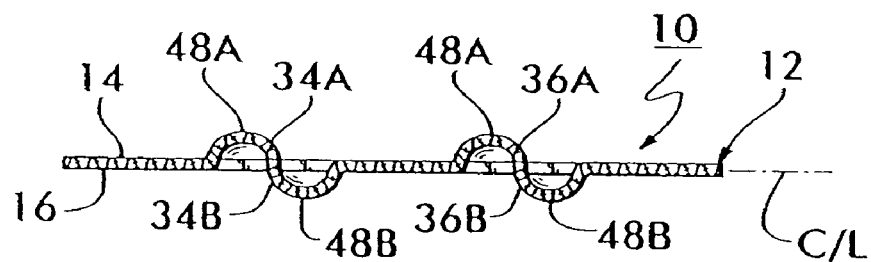
FIG. 2 is a sectional view along line 2-2 of FIG. 1, showing the central plane by line C/L.
Figure 3:
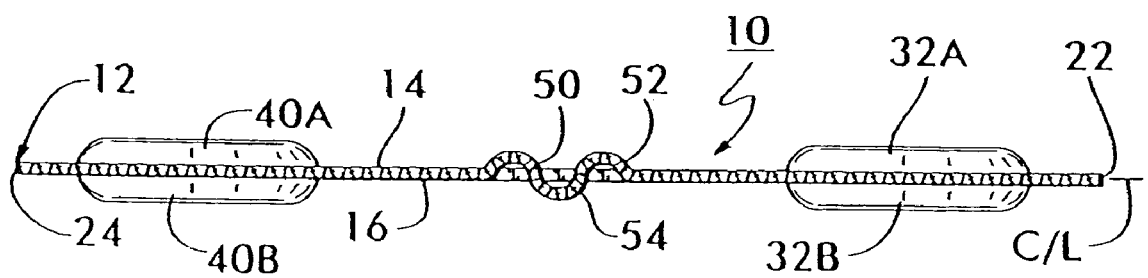
FIG. 3 is a sectional view along line 3-3 of FIG. 1, showing the central plane by line C/L.

A cleaning card in accordance with a preferred embodiment of this invention is illustrated at 10 in FIGS. 1-3. The cleaning card includes a substrate 12 having a central plane C/L between opposed surfaces 14 and 16. In addition, the substrate 12 has a machine-direction dimension disposed between opposed end edges 18 and 20, and a transverse direction disposed between opposed side edges 22 and 24.

The components making up the cleaning cards of this invention can be well-known components employed in conventional, prior art cleaning cards. For example, the cleaning card 10 can be made of a substrate 12 having an extruded, central film layer and a spunbond polyester layer applied to both sides of the central film layer while the central layer is still hot. The central film layer can be any desired plastic material, e.g., high density polyethylene, polystyrene, polypropylene, etc. The particular materials making up the components of the substrate 12 do not constitute a limitation on the broadest aspects of this invention.

Referring to FIGS. 1 and 2, the substrate 12 includes two sets 26, 28 of raised working areas therein, with the raised working areas in each set being linearly spaced apart in the machine direction, between opposed end edges 18 and 20, and also being disposed adjacent a corresponding side edge 22, 24, respectively.

Still referring to FIGS. 1 and 2, the set 26 of raised working areas includes a plurality of contiguous pairs 30, 32, 34 and 36, each pair including one working area extending outwardly on one side of the central plane (e.g., 30A, 32A, 34A and 36A) and the other working area of each pair extending outwardly on the opposite side of the central plane (30B, 32B, 34B and 36B).

Referring specifically to FIG. 1, it should be noted that the set 28 of raised working areas is identical to the set 26. In particular, the set 28 of working areas, like the set 26, includes a plurality of contiguous pairs of working areas 38, 40, 42 and 44, with one raised working area (38A, 40A, 42A and 44A) in each pair extending outwardly in one direction of the central plane and the other raised working area (38B, 40B, 42B and 44B) in each pair extending outwardly in an opposite direction from the central plane.

In a representative embodiment all of the raised working areas designated with the suffix "A" extend outwardly on the same side of the central plane and all of the raised working areas designated by the suffix "B" extend outwardly on the opposite side of the central plane.

It should be understood that accordance with the broadest aspects of this invention the arrangement of raised working areas in each set 26 and 28 can be varied within wide limits. For example, the raised working areas in each set do not need to be provided in spaced apart pairs, but rather could be provided as single raised working areas uniformly spaced apart along the machine direction of the substrate adjacent each of the side edges 22 and 24, respectively. Alternatively, although the preferred embodiment of this invention includes two sets 26, 28 of raised working areas substantially linearly spaced apart in the machine direction adjacent opposed side edges, respectively, it is within the scope of this invention to provide only one set of raised, spaced-apart working areas located adjacent only one side edge of the cleaning card. However, this latter structure is not as versatile as the preferred embodiment, since it will not provide effective cleaning of internal reading mechanisms unless it is inserted into the actuating mechanism in the correct direction, i.e., so that the set of raised working areas is disposed in alignment with the surfaces (e.g., sensors) to be cleaned.

In most actuating mechanisms the reading mechanisms for the operating cards, and therefore the reading mechanisms requiring cleaning, are generally adjacent one side of the actuating mechanism, particularly, when the actuating mechanism is intended to be actuated by a credit card or ATM card that has a magnetic operating stripe along one side edge thereof. Thus, in the preferred embodiment of this invention wherein two sets 26, 28 of linearly aligned raised working areas are provided adjacent the side edges 22, 24, respectively, effective cleaning will be achieved regardless which way the cleaning card is inserted into the actuating mechanism, and regardless of the side of the actuating mechanism on which the reading mechanism to be cleaned is located.

As can be seen best in FIG. 2, the effective working thickness, provided between the peaks 48A, 48B of opposed raised working areas is greater than the nominal thickness between the opposed surfaces 14, 16. In the preferred embodiment of this invention, the effective working thickness preferably is in the range between 30 mils and 120 mils, more preferably in the range between 60 mils and 90 mils, and most preferably about 75 mils.

In the preferred embodiments of this invention the nominal thickness of the cleaning card is less than 28 ml, more preferably less than 20 ml, even more preferably in the range of 12 to 15 ml and most preferably approximately 12 mils.

Referring to FIGS. 1 and 3, a unique feature of the present invention resides in the provision of a plurality of raised, rigidifying areas 50, 52 and 54 extending continuously over a majority of the machine-direction dimension of the cleaning card 10. Most preferably, the machine-direction dimension of each of the rigidifying areas is only slightly less than the machine-direction dimension of the cleaning card, between the opposed end edges 18 and 20. For example, in a representative embodiment of the invention the machine-direction dimension of the cleaning card is 3.375 inches long, and the length of each of the raised, rigidifying areas 50, 52 and 54 is 3.125 inches. In the preferred embodiment of this invention the plurality of raised rigidifying areas 50, 52 and 54 are contiguous to each other, and are centered in the cleaning card, both between the end edges 18 and 20 and the side edges 22 and 24.

Referring to FIG. 3, it should be noted that the two peripheral, raised rigidifying areas 50 and 52 extend outwardly from the same side of the central plane, and the central, linearly extending rigidifying area 54 extends outwardly from the opposite side of the central plane. This provides a balanced, rigidified structure, in accordance with the most preferred embodiments of this invention.

It should be noted that although the preferred embodiment of this invention includes three continuous, raised rigidifying areas, it is within the scope of this invention to provide a different number of such rigidifying areas, provided that the desired rigidity is achieved without creating excessive distortion in the card. Applicants have determined that generally the inclusion of only one raised, rigidifying area extending along the machine direction of the card does not provide the desired rigidity. In addition, applicants have determined that the inclusion of four (4) such raised rigidifying areas tends to cause the card to undesirably distort (e.g., the card curls and does not lay flat). However, generally the number of raised rigidifying areas employed in the cleaning card is not a limitation on the broadest aspects of this invention so long as the cleaning card provides its desired cleaning function.

In accordance with the preferred embodiment of this invention the effective rigidifying thickness provided by the linearly extending, raised, rigidifying areas 50, 52 and 54 is less than the effective working thickness and greater than the nominal thickness between the opposed surfaces of the substrate 12. This relationship can be seen best in FIG. 3.

In accordance with the preferred embodiments of this invention the effective rigidifying thickness is less than 92 mils, more preferably less than 75 mils and most preferably approximately 62.5 mils.

In accordance with the broadest aspects of this invention the effective rigidifying thickness can be greater than the effective working thickness, although there is no perceived benefit in such an arrangement. In fact, by increasing the effective rigidifying thickness extra material may be required; thereby unnecessarily increasing the cost of manufacturing the cleaning card.

Reference throughout this application to the raised, rigidifying areas extending "continuously" includes an arrangement wherein one or more breaks in the continuity of one or more of the linearly extending, raised, rigidifying areas exist, provided that in the region of the break there is at least one continuous linearly extending region of an adjacent, raised, rigidifying area, either extending outwardly of the central plane in the same direction or the opposite direction as the linearly extending, raised, rigidifying areas in which the break exists. Of course, reference to the raised, rigidifying area extending "continuously" includes a structure wherein each of the raised, rigidifying areas does extend continuously, without any break in it.

In a representative non-limiting embodiment of this invention a preferred cleaning card structure has a machine direction dimension of 3.375 inches, a cross-machine direction dimension of 2.1875 inches, a plurality of linearly extending, raised, rigidifying areas, each having a linear dimension of 3.125 inches, and the three (3) depicted linearly extending raised rigidifying areas 50, 52 and 54 being contiguous to each other and, as a unit, being centered between the opposed end edges 18 and 20, and the opposed side edges 22 and 24. In addition, each of the raised working areas 30A, 30B, 32A, 32B, etc., has a machine-direction dimension of approximately 0.125 inches and a transverse-direction dimension of 0.4995 inches. Each of the linearly extending raised rigidifying areas has a transverse-direction dimension of approximately 0.0938 inches. The effective working thickness is approximately 80 mils, the effective rigidifying thickness is approximately 62.5 mils and the nominal thickness is approximately 12 mils.

It should be noted that a variety of modifications can be made within the broadest aspects of this invention. For example, in certain applications it may be desirable to include the linearly extending rigidifying areas in regions adjacent the side edges 22 and 24 of the cleaning card. Also, as noted earlier, although it is preferred to include each of the linearly extending rigidifying areas as a continuous, linear section, it is within the scope of this invention to permit breaks in each of the linearly extending rigidifying areas, provided that an adjacent, or contiguous linearly extending rigidifying area is raised in an area overlying the break.

It also is within the scope of this invention to vary the location of the raised working areas, and to arrange them in a pattern other than the arrangement illustrated in the preferred embodiment of this invention. In particular, it should be noted that the raised working areas need to be located in an area for cleaning desired internal surfaces of machine components, e.g., actuating mechanism(s), and the location of such internal surfaces may dictate a different location and arrangement of raised working areas in the cleaning card 10.

Without further elaboration, the foregoing will so fully illustrate our invention that others may, by applying current or future knowledge; readily adapt the same for use under various conditions of service.

What we claim as our invention is the following:

1. A cleaning card for use in cleaning internal surfaces of machine components, said cleaning card including a substrate having a central plane between opposed surfaces thereof, a machine direction dimension defined between opposed end edges and a transverse direction dimension defined between opposed side edges, said opposed surfaces each having a plurality of discrete raised working areas for engaging and cleaning internal surfaces to be cleaned, at least some discrete raised working areas extending outwardly on each side of said central plane, said discrete raised working areas each including a peak and a peripheral wall having an edge remote from said peak, said peak of each raised working area being further from the central plane than the edge of the peripheral wall remote from said peak, and a plurality of raised, rigidifying areas having a configuration different from the raised working areas, at least one of said rigidifying areas extending outwardly on each side of said central plane and extending in the machine direction continuously over a majority of the machine direction dimension of the cleaning card, said cleaning card substrate having an effective working thickness that is greater than the nominal thickness between the opposed surfaces of the substrate, said raised, rigidifying areas being less resilient than said raised working areas and having an effective rigidifying thickness less than the effective working thickness and greater than the nominal thickness between the opposed surfaces of the substrate.

2. The cleaning card of claim 1, wherein said discrete raised working areas are sufficiently resilient to engage opposed internal surfaces of machine components that are spaced apart at varying distances from each other.

3. The cleaning card of claim 1, wherein said plurality of raised, rigidifying areas includes at least three raised rigidifying areas.

4. The cleaning card of claim 3, wherein said plurality of raised, rigidifying areas are contiguous to each other.

5. The cleaning card of claim 3, wherein two of said raised rigidifying areas extend in one direction from the central plane of the substrate and a third of said raised rigidifying areas extends in an opposite direction from the central plane of the substrate.

6. The cleaning card of claim 3, wherein said raised rigidifying areas are located substantially in the medial region of said substrate substantially equally spaced between the opposed side edges of the substrate.

7. The cleaning card of claim 3, wherein said plurality of discrete, raised working areas include a first set of raised working areas substantially linearly spaced apart in the machine direction adjacent one side edge of said substrate and a second set of raised working areas substantially linearly spaced apart in the machine direction adjacent the opposed side edge of said substrate.

8. The cleaning card of claim 7, wherein each set of raised working areas includes peaks extending outwardly on each side of said central plane.

9. The cleaning card of claim 7, wherein the raised working areas in each set are included in a plurality of contiguous pairs, each pair including one working area extending outwardly on one side of the central plane and another working area extending outward on an opposite side of the central plane, the contiguous pairs in each set being spaced apart in the machine direction of the substrate.

10. The cleaning card of claim 1, wherein said raised rigidifying areas are located substantially in the medial region of said substrate substantially equally spaced between the opposed side edges of the substrate.

11. The cleaning card of claim 1, wherein said plurality of discrete, raised working areas include a first set of raised working areas substantially linearly spaced apart in the machine direction adjacent one side edge of said substrate and a second set of raised working areas substantially linearly spaced apart in the machine direction adjacent the opposed side edge of said substrate.

13. The cleaning card of claim 11, wherein each set of raised working areas includes peaks extending outwardly on each side of said central plane.

13. The cleaning card of claim 11, wherein the raised working areas in each set are included in a plurality of contiguous pairs, each pair including one working area extending outwardly on one side of the central plane and another working area extending outward on an opposite side of the central plane, the contiguous pairs in each set being spaced apart in the machine direction of the substrate.

* * * * *

UNITED STATES PATENT AND TRADEMARK OFFICE
CERTIFICATE OF CORRECTION

| | | |
|---|---|---|
| PATENT NO. | : 7,631,390 B1 | Page 1 of 1 |
| APPLICATION NO. | : 11/156514 | |
| DATED | : December 15, 2009 | |
| INVENTOR(S) | : Klein et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this

Second Day of November, 2010

David J. Kappos
*Director of the United States Patent and Trademark Office*